United States Patent [19]
Shirai et al.

[11] Patent Number: 5,669,353
[45] Date of Patent: Sep. 23, 1997

[54] VALVE FEEDBACK CONTROL HAVING REDUNDANT VALVE OPENING SENSORS

[75] Inventors: Kazunari Shirai, Chita-gun; Hidemasa Miyano, Kariya; Shigeru Kamio; Yoshimasa Nakaya, both of Nagoya, all of Japan

[73] Assignee: Nippondenso Co., Ltd., Kariya, Japan

[21] Appl. No.: 611,405

[22] Filed: Mar. 6, 1996

[30] Foreign Application Priority Data

May 18, 1995 [JP] Japan .................. 7-119631

[51] Int. Cl.⁶ .................................................. F02D 7/00
[52] U.S. Cl. .................................................. 123/399
[58] Field of Search ........................... 123/399, 630, 123/478, 198 D, 396; 364/431.05; 180/197

[56] References Cited

U.S. PATENT DOCUMENTS

| | | | |
|---|---|---|---|
| 4,819,597 | 4/1989 | Gale et al. | 123/399 |
| 5,163,402 | 11/1992 | Taguchi et al. | 123/396 |
| 5,170,769 | 12/1992 | Berger et al. | 123/399 |
| 5,339,782 | 8/1994 | Golzer et al. | 123/399 |
| 5,429,091 | 7/1995 | Huber et al. | 123/399 |
| 5,429,092 | 7/1995 | Kamei | 123/399 |
| 5,433,283 | 7/1995 | Shultz et al. | 180/197 |
| 5,447,134 | 9/1995 | Yokoyama | 123/399 |
| 5,476,078 | 12/1995 | Pfalzgraf et al. | 123/399 |

FOREIGN PATENT DOCUMENTS

| | | |
|---|---|---|
| A-01-167423 | 5/1989 | Japan . |
| A-03-281969 | 7/1990 | Japan . |
| A-01-167423 | 3/1991 | Japan . |
| A-03-281969 | 8/1992 | Japan . |
| WO 90/08251 | 7/1990 | WIPO ................ 123/399 |

OTHER PUBLICATIONS

Patent Abstracts of Japan, vol. 018, No. 644 (M–1718) 7 Dec. 1994 & JP-A-06 249040 (Mitsubishi Electric Corp), 6 Sep. 1994.
Patent Abstracts of Japan, vol. 016, No. 111 (M–1223), 18 Mar. 1992 & JP-A-03 281969 (Suzuki Motor Corp), 12 Dec. 1991.

Primary Examiner—Raymond A. Nelli
Attorney, Agent, or Firm—Nixon & Vanderhye P.C.

[57] ABSTRACT

A throttle control system has two throttle opening sensors. When one sensor in a PID feedback control loop becomes abnormal, as sensed by monitoring the difference between outputs of the dual sensors, the use of sensor output for throttle feedback control is switched from the abnormal one to the other, normal one. Which one of the throttle opening sensors has become abnormal is determined by monitoring the intensity of electric current flowing to a DC motor which drives the throttle valve. Further, if an abnormality in the newly-used other sensor is determined, feedback control is continued based on an estimation of throttle opening calculated by using output of the sensor before its malfunction.

32 Claims, 4 Drawing Sheets

VALVE FEEDBACK CONTROL HAVING REDUNDANT VALVE OPENING SENSORS

CROSS REFERENCE TO RELATED APPLICATION

This application is based on and claims priority of Japanese Patent Application No. 7-119631 filed on May 18, 1995, the content of which is incorporated herein by reference.

BACKGROUND OF THE INVENTION

1. Field of the Invention

The present invention relates to a valve feedback control, such as throttle control for internal combustion engines for controlling the opening angle of a throttle valve by driving an electric motor according to depression of an accelerator pedal.

2. Description of Related Art

As prior art relating to a throttle control apparatus for internal combustion engines, Japanese Patent Publication laid-open No. 3-281969 is known. According to this art, the apparatus has a double sensor system having two throttle angle-detecting sensors provided side by side. Output values of both sensors are always compared with each other. If the difference between the output values is more than a predetermined value (in consideration of tolerance), it is determined that the sensor and/or the sensors are abnormal and the output power of the internal combustion engine is restricted.

In the above-described art, which of the two throttle angle sensors is abnormal is not determined. Thus, a control of limiting the output power of the internal combustion engine is executed although one of the throttle angle sensors may be normal. Thus, the prior art has a disadvantage that the performance of the system deteriorates outstandingly once one of the sensors becomes abnormal.

SUMMARY OF THE INVENTION

The present invention has been made to solve the above-described problem and it has a primary object to provide a valve feedback control, such as a throttle control for internal combustion engines having two sensors, for detecting the opening angle of a throttle valve, provided side by side.

It also has a secondary object to provide a throttle control in which, when one of the two sensors has become abnormal, the other sensor is used to continue the control of the opening angle of the throttle valve.

According to the present invention, it is determined that one of the two valve angle sensors is abnormal when the difference between their outputs is greater than a predetermined value. Upon this determination, which of the two opening degree sensors is abnormal is determined based on the intensity of electric current flowing to an electric motor. Therefore, the normal opening angle sensor can be determined.

Preferably, the feedback control is applied to engine throttle valve control.

Preferably, determination of sensor abnormality is made when the intensity of electric current driving the motor is greater than a predetermined value. That is, the intensity of the electric current driving the motor does not become more than the predetermined value when the throttle angle sensor is normal. Therefore, whether the throttle angle sensor is abnormal or not can be detected by monitoring the intensity of electric current driving the motor.

Preferably, when it is determined that the throttle angle sensor being currently used in the throttle control is abnormal, the sensor to be used for the control is switched from the abnormal throttle angle sensor to the normal sensor. In this manner, a normal throttle control can be continued.

More preferably, when one throttle angle sensor is determined to be abnormal, it is further determined whether or not the other throttle opening degree sensor is also abnormal. When the other sensor is also abnormal, the angle of the throttle valve is controlled by using the output value of the other throttle angle sensor before the abnormality thereof is detected. Thus a normal throttle control may be continued by using an estimated value based on the output value of the other sensor before the abnormality thereof is detected, when the other sensor being currently used in the control has become abnormal after one throttle angle sensor becomes abnormal.

DETAILED DESCRIPTION OF PRESENTLY PREFERRED EMBODIMENT

Exemplary embodiments of the present invention will be described below in detail with reference to the accompanying drawings.

Figure 1:
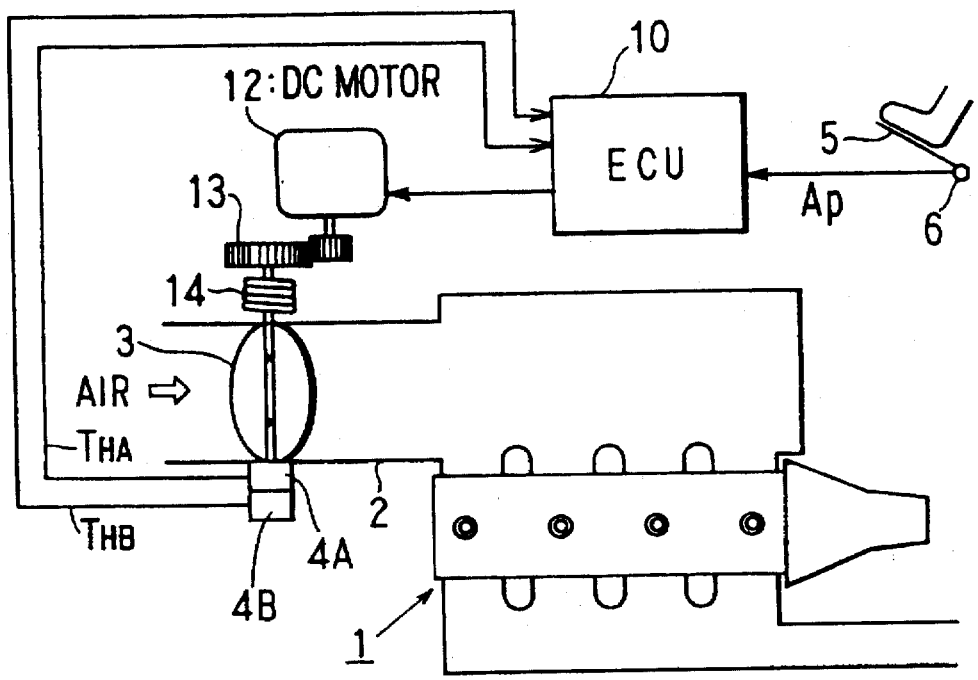
FIG. 1 is a schematic view showing the entire construction of a throttle control apparatus for internal combustion engines according to an embodiment of the present invention.

In FIG. 1 showing the entire construction of a throttle control apparatus for internal combustion engines, reference numeral 1 denotes an internal combustion engine to which air is supplied through an air intake duct 2. A throttle valve 3 is rotatably installed inside the air intake duct 2. The throttle valve 3 is operatively linked with two throttle angle sensors 4A and 4B for detecting the opening angle of the throttle valve 3. Reference numeral 5 denotes an accelerator pedal linked with an accelerator angle sensor 6 for detecting the degree of pedal depression.

Figure 2:
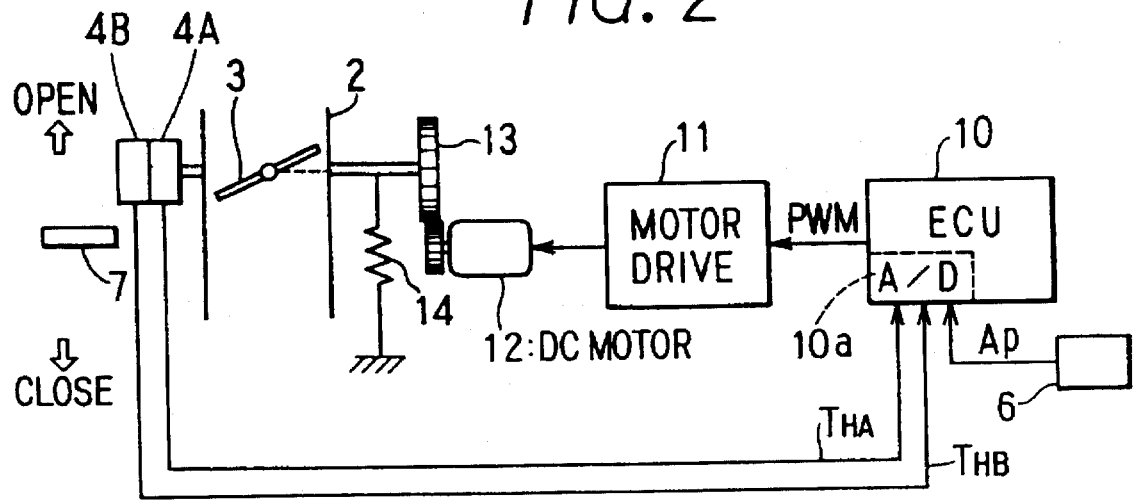
FIG. 2 is another schematic view showing the construction of main parts of the throttle control apparatus according to the embodiment of the present invention.

Reference numeral 10 denotes an ECU (electronic control unit) which receives a throttle angle indication signal THA, a throttle opening degree-indication signal THB, and an accelerator opening degree-indication signal Ap outputted from each of the throttle opening degree sensors 4A and 4B and the accelerator angle sensor 6. Reference numeral 12 denotes a direct current (DC) motor serving as an actuator to which electric current is supplied from a motor driving circuit 11 provided between the ECU 10 and the DC motor 12 as shown in FIG. 2. Reference numeral 13 denotes a reduction gear train provided between the DC motor 12 and the throttle valve 3. A return spring 14 normally biases the throttle valve 3 to the completely closed side thereof.

In this embodiment, it is assumed that a PID (Proportional-Integral Derivative) control is executed by using the throttle angle sensor 4A of the two throttle angle sensors 4A and 4B.

As shown in FIG. 2, the following signals are inputted to the ECU 10 by performing analog-to-digital conversions thereof by an A/D converter 10a: the accelerator opening degree-indication signal Ap outputted from the accelerator pedal depression angle sensor 6 in correspondence with the amount of depression of the accelerator pedal 5; and the throttle angle-indication signal THA and the throttle angle-indication signal THB outputted from each of the throttle angle sensors 4A and 4B in correspondence with the angle of the throttle valve 3. According to the levels of the signals, the ECU 10 outputs PWM signals (pulse width-modulated signals) to the motor driving circuit 11. Upon receipt of the PWM signals, electric current is applied from the motor driving circuit 11 to the DC motor 12. As a result, the DC motor 12 is driven, and the rotation thereof is transmitted to the throttle valve 3 through the reduction gear train 13 to open or close the throttle valve 3. A closing stopper 7 for regulating the completely closed position of the throttle valve 3 is provided.

Figure 3:
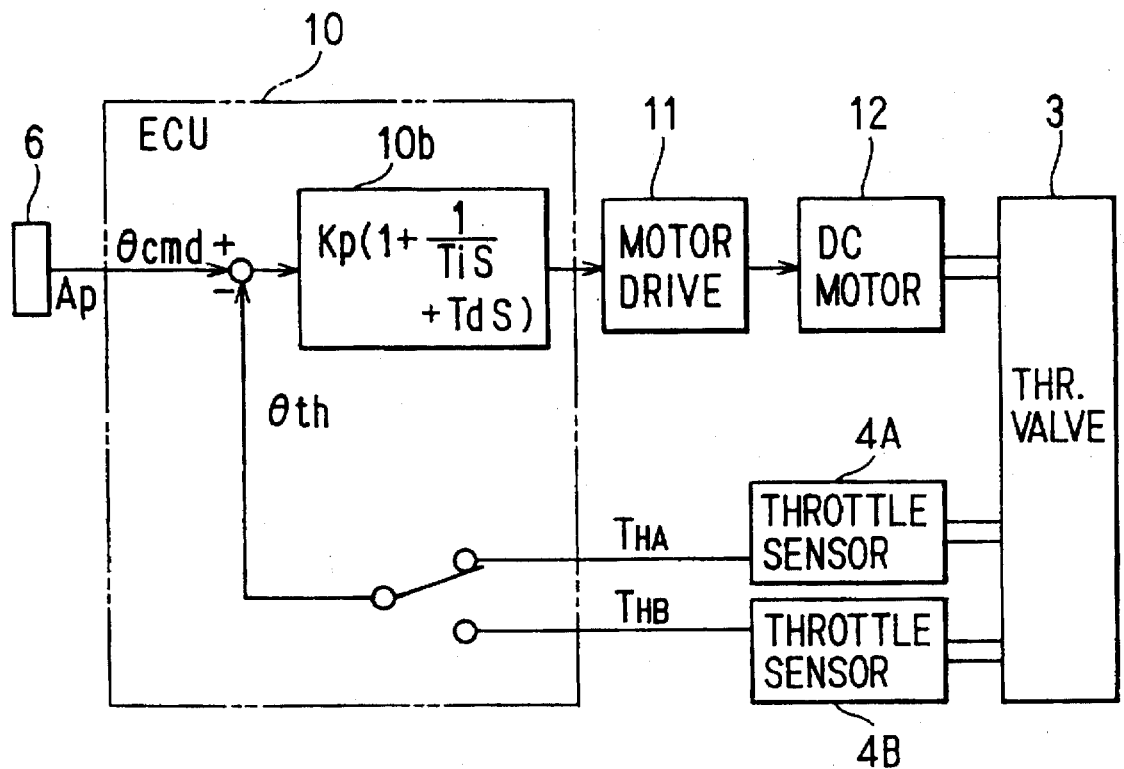
FIG. 3 is a block diagram showing the flow of signals in the throttle control apparatus according to the embodiment of the present invention.

As shown in FIG. 3, a PID control circuit 10b of the ECU 10 receives a deviation between a throttle angle-command value (target angle) θcmd calculated based on the accelerator angle-indication signal Ap outputted from the accelerator angle sensor 6 in correspondence with the angle of the accelerator pedal 5 and an output value (actual or feedback value) θth calculated based on the throttle angle-indication signal THA outputted from the throttle angle sensor 4A in correspondence with the angle of the throttle valve 3. Then, in the PID control circuit 10b, a compensation is performed by means of predetermined control gains Kp, Ti, and Td of respective Proportional, Integral, and Derivative terms. Thereafter, the DC motor 12 to be controlled is driven by the PWM-controlled electric current through the motor driving circuit 11 so as to zero the calculated deviation.

Figure 4:
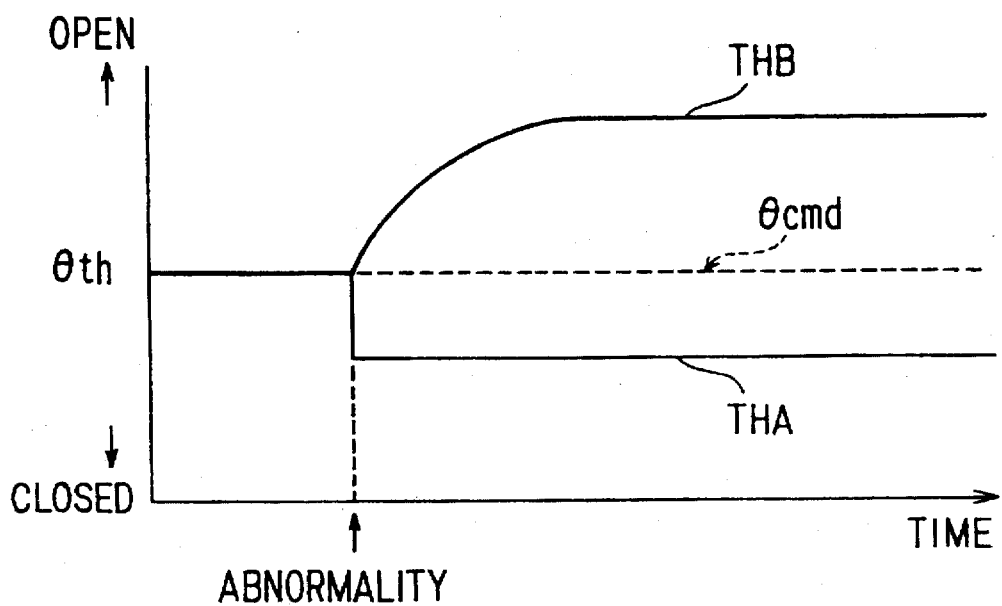
FIG. 4 is a time chart showing a behavior of a throttle valve when one of two throttle angle sensors of the throttle control apparatus according to the embodiment of the present invention has become abnormal.

Description is made with reference to FIG. 4 on the behavior of the sensor system when the throttle angle sensor 4A has become abnormal in the feedback control of the angle of the throttle valve 3 to be executed by the double sensor system having the throttle angle sensors 4A and 4B provided side by side.

As shown in FIG. 4, when the throttle angle sensor 4A being used normally in executing the feedback control by means of the PID control becomes abnormal and consequently, when the output value (feedback value) THA of the throttle angle sensor 4A has deviated (for example, in the throttle valve-closed side) from the throttle angle-command value (target angle of throttle valve) θcmd, the DC motor 12 is rotated to the throttle valve-opening side to eliminate the deviation (θcmd-THA). At this time, the duty ratio (hereinafter referred to as merely "Duty") of the PWM signal outputted from the ECU 10 in correspondence with an intensity of the electric current for driving the DC motor 12 is normally 0%–10%. Even though the DC motor 12 is rotated continuously, the output value of the throttle angle sensor 4A does not attain the throttle angle-command value because the throttle angle sensor 4A is abnormal. Even though larger electric current is applied thereto, the output of the sensor 4A will not follow because of its abnormality. As a result, the current will reach the maximum intensity ("Duty"=100%) to rotate the DC motor 12 to the throttle valve-opening side. The output value of the throttle angle sensor 4A will not reach the throttle opening degree-command value and thus this state continues permanently.

On the other hand, even when the throttle angle sensor 4B which is not used in the feedback control becomes abnormal, there occurs merely a difference between the output values of the throttle angle sensors 4A and 4B and thus the feedback control can be continued without problems. That is, which of the throttle angle sensors 4A and 4B has become abnormal can be determined by monitoring the absolute value of the difference between the output values of the throttle angle sensors 4A and 4B and the "Duty". Accordingly, it is possible to continue the feedback control by using the normal throttle opening degree sensor.

Figure 5:
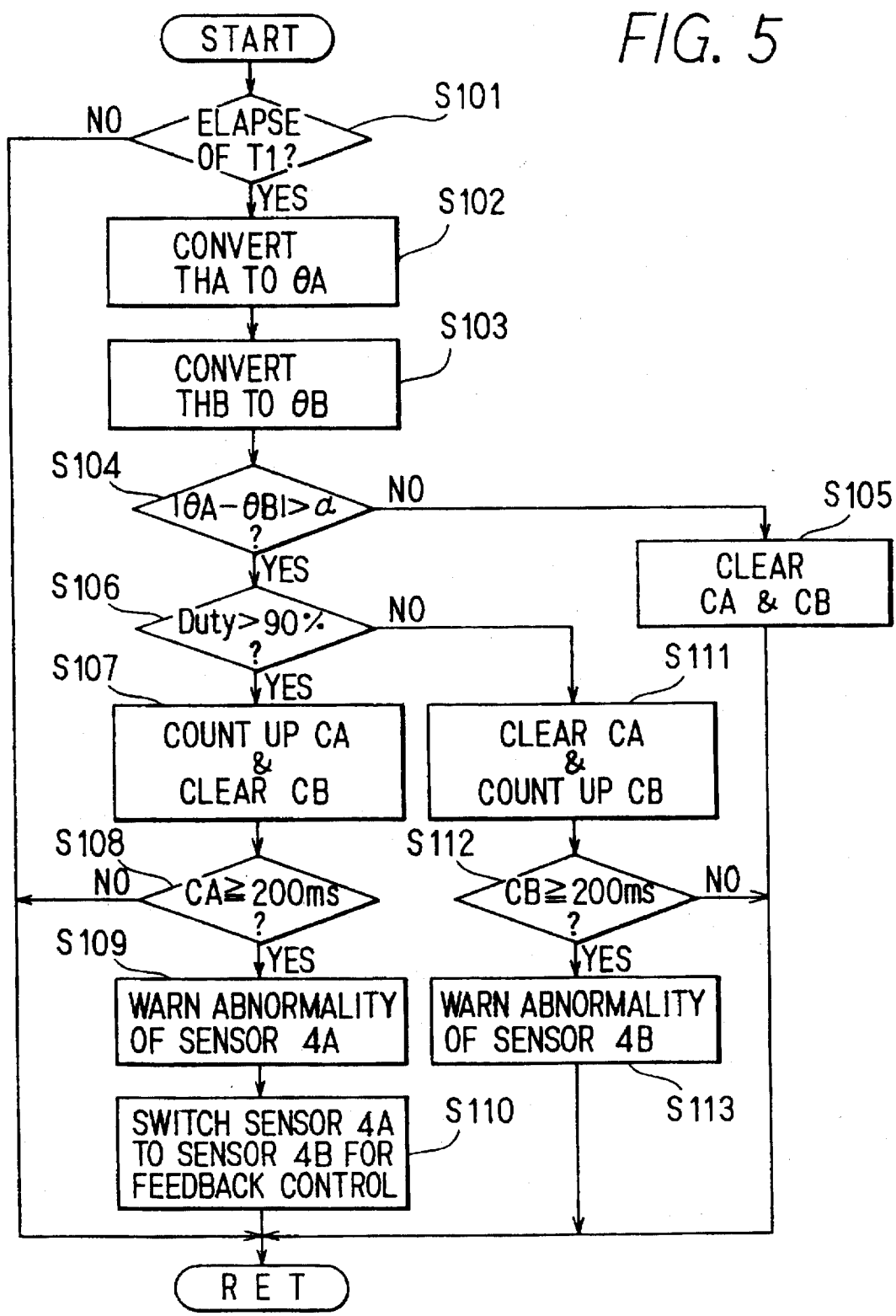
FIG. 5 is a flowchart showing a processing procedure to be executed by an ECU which is used in the throttle control apparatus according to the embodiment of the present invention, when one of the two throttle angle sensors has become abnormal.

Description is made on a processing procedure to be executed by the ECU 10 of the throttle control apparatus for internal combustion engines according to the embodiment of the present invention, with reference to a flowchart shown in FIG. 5.

Initially, at step S101, it is determined whether a time period T1 (for example, 4 ms; the shorter the time period T1 is, the better) has elapsed in relation to a previous execution time at which a determination was made. If the determination condition at step S101 is not satisfied, the execution of this routine terminates. If the determination condition at step S101 is satisfied, the program goes to step S102 at which a value θA (same as θth of FIG. 3) is determined by performing an analog-to-digital conversion of the throttle angle-indication signal THA outputted from the throttle angle sensor 4A. Then, the program goes to step S103 at which a value θB is determined by performing an analog-to-digital conversion of the throttle angle-indication signal THB outputted from the throttle angle sensor 4B.

Then, the program goes to step S104 at which it is determined whether the absolute value of the difference between the value θA obtained at step S102 and the value θB obtained at step S103 is greater than an abnormality determination constant α (for example, 10°). If the determination condition at step S104 is not satisfied, the program goes to step S105 at which an abnormality detection counter CA for detecting the abnormality of the throttle angle sensor 4A and an abnormality detection counter CB for detecting the abnormality of the throttle angle sensor 4B are cleared. Then, the execution of this routine terminates.

If the determination condition at step S104 is satisfied, it is determined that the throttle angle sensor 4A or the throttle angle sensor 4B is abnormal. Then, the program goes to step S106 at which it is determined whether the "duty" is greater than 90%. If the determination condition at step S106 is satisfied, it is determined that the throttle angle sensor 4A is abnormal because of use of the output of the sensor 4A. Then, the program goes to step S107 at which the count-up of the abnormality detection counter CA is executed, whereas the abnormality detection counter CB is cleared.

Then, the program goes to step S108 at which it is determined whether a time period counted up by the abnormality detection counter CA is more than a predetermined time period, 200 ms in this embodiment. The predetermined time period (200 ms) is selected according to a mechanical or electrical time constant of the system. If the determination condition at step S108 is not satisfied, the execution of this routine terminates. If the determination condition at step S108 is satisfied, i.e., if the time period counted up by the abnormality detection counter CA is more than 200 ms, it is determined that the throttle angle sensor 4A is abnormal. Then, the program goes to step S109 at which a warning that the throttle angle sensor 4A is abnormal is issued. Then, the program goes to step S110 at which the throttle angle sensor 4A being used in the feedback control of the opening degree of the throttle valve 3 is switched to the throttle opening degree sensor 4B to continue the feedback control. Then, the execution of this routine terminates.

If the determination condition at step S106 is not satisfied, it is determined that the throttle angle sensor 4B is abnormal. Then, the program goes to step S111 at which the abnormality detection counter CA is cleared, whereas the count-up of the abnormality detection counter CB is executed. Then, the program goes to step S112 at which it is determined whether a time period counted up by the abnormality detection counter CB is more than 200 ms. If the determination condition at step S112 is not satisfied, the execution of this routine terminates. If the determination condition at step S112 is satisfied, i.e., if the time period counted up by the abnormality detection counter CB is more than 200 ms, it is determined that the throttle opening degree sensor 4B is abnormal. Then, the program goes to step S113 at which a warning that the throttle angle sensor 4B is abnormal is issued. Then, the execution of this routine terminates. At this time, the feedback control of the angle of the throttle valve 3 is continued by means of the throttle angle sensor 4A which is normal.

As described above, if one of the throttle angle sensors 4A and 4B, of the double sensor system, arranged side by side becomes abnormal, the abnormal throttle angle sensor is detected, and the normal throttle angle sensor is used to continue the feedback control of the angle of the throttle valve 3.

Description will be made below with reference to FIG. 6 on the feedback control of the angle of the throttle valve to be executed by the sensor system by using one normal throttle angle sensor (single sensor system) after the other throttle angle sensor becomes abnormal in the feedback control of the angle of the throttle valve to be executed by the double sensor system having the throttle angle sensors 4A and 4B arranged side by side.

As described previously, in the PID control, the to-be-controlled DC motor 12 is supplied with the electric current corresponding to the degree of the deviation between the throttle opening degree-command value (target angle of throttle valve) and the output value (feedback value) of the throttle angle sensor so as to reduce the deviation to zero. It is conceivable to use the output value at a previous execution time to control the angle of the throttle valve 3 by always monitoring whether the variation in the output value of the throttle angle sensor is greater than a determination reference value so as to determine whether or not the throttle angle sensor is abnormal. However, if the execution of the PID control is continued by using the output value of the throttle angle sensor at the previous execution time, the deviation does not become small although the DC motor 12 is in operation. When the rotation speed of the DC motor 12 becomes so high, a phenomenon of an overshoot or a hunting may occur in the throttle valve 3 immediately after the output value of the throttle angle sensor reaches a failure region. As a result, the output value of the throttle angle sensor changes rapidly.

In consideration of the above problem, when the output value of the throttle angle sensor has reached the failure region, the angle of the throttle valve 3 is controlled not by using the output value thereof detected at the previous execution time but by using an estimated value of the output value thereof based on the variation in the output value thereof detected immediately prior to the time at which the output value thereof has reached the failure region. By executing such a control, the output value (feedback value) of the throttle angle sensor gradually approaches the throttle angle-command value (target angle of the throttle valve) and the deviation gradually approaches zero. Consequently, the motor power becomes gradually smaller, which prevents the occurrence of the overshoot or hunting in the throttle valve 3 after the output value of the throttle angle sensor reaches the failure region.

Figure 6:
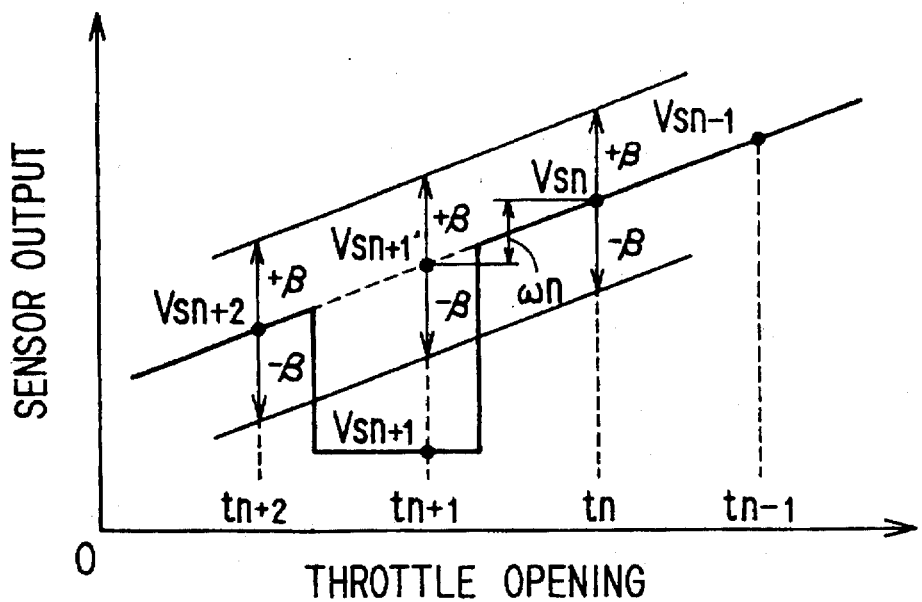
FIG. 6 is a graph showing a relationship between the opening angle of the throttle valve of the throttle control apparatus according to the embodiment of the present invention and the output value of the throttle angle sensor thereof.

FIG. 6 is a graph showing the relationship between the angle of the throttle valve and the output value of the throttle angle sensor. An equation (1) expressed below is established, supposing that an output value of the throttle angle sensor at a time tn is vsn; a variation in the output value of the throttle angle sensor at the time tn is ωn (negative value in FIG. 6); and an estimated value of the output value of the throttle angle sensor at a time tn+1 is Vsn+1'. (Equation 1)

$$Vsn + \omega n = Vsn+1' \tag{1}$$

When the following inequality equation (2) is satisfied as a result of a comparison between an actual output value Vsn+1 of the throttle angle sensor at the time tn+1 and the estimated value Vsn+1' of the output value thereof at the time tn+1, the throttle angle sensor is determined as being normal. In this case, the output value Vsn+1 of the throttle angle sensor is used as it is in the PID control. A term β in the equation (2) which is an abnormality-determination constant for determining whether or not the throttle angle sensor is abnormal selected according to a mechanical time constant of the system. (Equation 2)

$$Vsn+1' - \beta < Vsn+1 < Vsn+1' + \beta \tag{2}$$

If the equation (2) is not satisfied, it is determined that the throttle angle sensor is abnormal. Then, a driver is warned that the throttle angle sensor is abnormal, and the PID control is executed by using the estimated value Vsn+1' of the output value of the throttle angle sensor instead of the output value thereof. In this manner, the PID control can be executed by preventing the occurrence of overshoot or hunting in throttle valve 3, even though the throttle angle sensor becomes abnormal due to an abnormal angle of the throttle valve 3.

Figure 7:
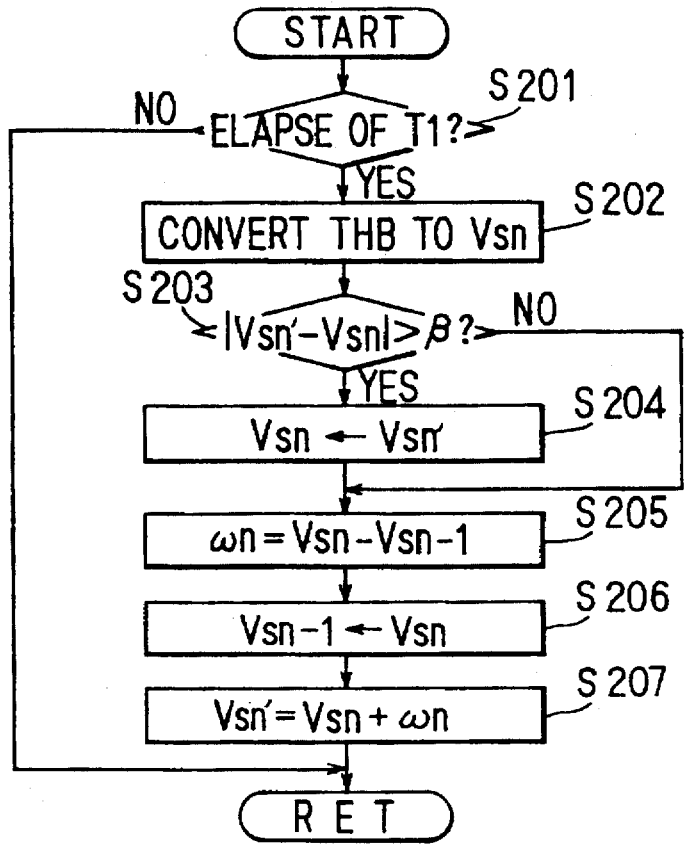
FIG. 7 is a flowchart showing a processing procedure to be executed by the ECU which is used in the throttle control apparatus according to the embodiment of the present invention, when one of the two throttle angle sensors has become abnormal.

With reference to a flowchart shown in FIG. 7, description is made on a processing procedure to be executed by the ECU 10 of the throttle control apparatus of the internal combustion engine according to the embodiment of the present invention, by using only one of the throttle angle sensors. In this embodiment, it it assumed that the throttle angle sensor 4A becomes abnormal and is then switched to the throttle angle sensor 4B.

Initially, at step S201, it is determined whether a time period T1 (for example, 4 ms; the shorter the time period T1 is, the better) has elapsed in relation to a previous execution time at which a determination was made. If the determination condition at step S201 is not satisfied, the execution of this routine terminates. If the determination condition at step S201 is satisfied, the program goes to step S202 at which a value Vsn (same as θth of FIG. 3) is determined by performing an analog-to-digital conversion of the throttle angle-indication signal THA outputted from the throttle angle sensor 4B.

Then, the program goes to step S203 at which it is determined whether the absolute value of the difference between an estimated value Vsn' of an output value of the throttle angle sensor 4B determined at a previous execution time and the output value thereof determined at step S202 is greater than the abnormality-determination constant β. If the determination condition at step S203 is satisfied, it is determined that the throttle angle sensor 4B is abnormal. Then, the program goes to step S204 at which the estimated value Vsn' of the output value of the throttle angle sensor 4B is substituted into the output value Vsn thereof at a current execution time. Then, the program goes to step S205. If the determination condition at step S203 is not satisfied, the program skips step S204. At step S205, an output value Vsn-1 of the throttle angle sensor 4B at the previous execution time is subtracted from the output value Vsn thereof at the current execution time to determine a variation ωn of the output value thereof at the current execution time.

Then, the program goes to step S206 at which the output value Vsn of the throttle angle sensor 4B at the current execution time is stored as Vsn-1. Then, the program goes to step 207 at which the variation ωn of the output value of the throttle angle sensor 4B at the current execution time determined at step S205 is added to the output value Vsn thereof at the current execution time to determine the estimated value Vsn' of the output value thereof at a next execution time. Then, the execution of this routine terminates.

The above-described processing allows the output value of the throttle angle sensor 4B in the failure region to be equal to that in the normal region and hence, the PID control to be normally executed, thus preventing the occurrence of overshoot or hunting in throttle valve 3 immediately after the output value of the throttle angle sensor 4B reaches the failure region.

The present invention having been described should not be limited to the throttle control in the presently preferred exemplary embodiment but may be applied to or modified in other ways without departing from the scope and spirit of the invention.

What is claimed is:

1. A throttle control apparatus for controlling the opening angle of a throttle valve by a direct current motor in accordance with the depression of an accelerator pedal, the apparatus comprising:

two throttle angle sensors operatively coupled with the throttle valve to detect its degree of opening;

abnormality determination means for determining that one of the two throttle angle sensors is abnormal when a difference between outputs of the two sensors is greater than a predetermined value; and abnormal sensor determination means for using a throttle control parameter generated in response to the sensor currently being used to determine which one of the two sensors is abnormal when one has been determined to be abnormal.

2. The throttle control apparatus of claim 1, further comprising:

sensor-switching means for switching between the use of the sensor being currently used to another one of the two sensors when the abnormal sensor determination means has determined that the sensor being currently used is abnormal.

3. The throttle control apparatus of claim 1, wherein the abnormal sensor determination means determines which of the two sensors is abnormal based on the intensity of electric current driving the DC motor.

4. The throttle control apparatus of claim 3, wherein the abnormal sensor determination means determines that the sensor being currently used is abnormal when the intensity of electric current driving the DC motor is greater than a predetermined intensity.

5. The throttle control apparatus of claim 2, wherein the abnormal sensor determination means determines which of the two sensor is abnormal based on the intensity of electric current driving the DC motor.

6. The throttle control apparatus of claim 5, wherein the abnormal sensor determination means determines that the sensor being currently used is abnormal when the intensity of electric current driving the DC motor is greater than a predetermined intensity.

7. The throttle control apparatus of claim 1, further comprising:

second abnormal sensor determination means for determining whether the other one of the two sensors is abnormal when the first mentioned abnormal sensor determination means has determined that one of the sensors is abnormal; and abnormal time control means for controlling the opening of the throttle valve by using a signal based on an output of said other sensor before the abnormality thereof was detected when the second abnormal sensor determination means has determined that the said other sensor is abnormal.

8. The throttle control apparatus of claim 2, further comprising:

second abnormal sensor determination means for determining whether the other one of the two sensors is abnormal when the first-mentioned abnormal sensor determination means has determined that one of the sensors is abnormal; and abnormal time control means for controlling the opening of the throttle valve by using a signal based on an output of the said other sensor before the abnormality thereof was detected when the second abnormal sensor determination means has determined that the said other sensor is abnormal.

9. The throttle control apparatus of claim 3, further comprising:

second abnormal sensor determination means for determining whether the other one of the two sensors is abnormal when the first-mentioned abnormal sensor determination means has determined that one of the sensors is abnormal; and abnormal time control means for controlling the opening of the throttle valve by using a signal based on an output of said other sensor before the abnormality thereof was detected when the second abnormal sensor determination means has determined that the said other sensor is abnormal.

10. The throttle control apparatus according to claim 5, further comprising:

second abnormal sensor determination means for determining whether the other one of the two sensors is abnormal when the first-mentioned abnormal sensor determination means has determined that one of the sensors is abnormal; and abnormal time control means for controlling the opening of the throttle valve by using a signal based on an output of the said other sensor before the abnormality thereof was detected when the second abnormal sensor determination means has determined that the said other sensor is abnormal.

11. A control method for controlling the opening angle of a valve with an electric motor by the use of two valve angle sensors operatively coupled with the valve to detect its degree of opening, the method comprising the steps of:

determining that one of the two sensors is abnormal when a difference between outputs of the two sensors is greater than a predetermined value; and determining which one of the two sensors is abnormal when one has been determined to be abnormal by using a throttle control parameter generated in response to the sensor currently being used to control it.

12. The method of claim 11, further comprising the step of:

switching between the use of the sensor being currently used to the other one of the two sensors when it is determined that the sensor being currently used is abnormal.

13. The method of claim 11, further comprising the steps of:

detecting electric current flowing to the electric motor; and determining which of the two sensors is abnormal based on intensity of the detected electric current.

14. The method of claim 13, wherein the abnormal sensor determining step determines that the sensor being currently used is abnormal when the detected electric current is greater than a predetermined value.

15. The method of claim 11, further comprising the steps of:

determining whether the other one of the two sensors is abnormal when the first abnormal sensor determining step has determined that one of the sensors is abnormal; and controlling the valve by using a signed based on an output of the said other sensor before the abnormality thereof was determined when the second abnormal sensor determining step has determined that the said other sensor is abnormal.

16. The method of claim 11, wherein the valve is a throttle valve of an internal combustion engine.

17. The throttle control apparatus of claim 3, wherein the abnormal sensor determination means determines which of the two sensors is abnormal based on a duty ratio of a PWM signal corresponding to the intensity of electric current driving the DC motor.

18. The method of claim 11, wherein the abnormal sensor determining step includes a step of determining which of the two sensors is abnormal based on a duty ratio of a PWM signal corresponding to the intensity of electric current driving the DC motor.

19. A throttle control apparatus for internal combustion engines for controlling a throttle valve by a direct current motor in accordance with the depression of an accelerator pedal, the apparatus comprising:

two throttle angle sensors operatively coupled with the throttle valve to detect its degree of opening;

abnormality determination means for determining that one of the two sensors is abnormal when a difference between outputs of the two sensors is greater than a predetermined value; and abnormal sensor determination means responsive to an abnormality determination by said abnormality determination means for determining which of the two sensors is abnormal when a valve control parameter generated in response to an output of one of said sensors exceeds a threshold for a predetermined period of time.

20. The throttle control apparatus of claim 19, wherein the abnormal sensor determination means determines which of the two sensors is abnormal when an intensity of electric current for driving the DC motor exceeds a threshold for a predetermined period of time.

21. The throttle control apparatus of claim 19, wherein the abnormal sensor determination means determines which of the two sensors is abnormal when a duty ratio of a PWM signal corresponding to the intensity of electric current driving the DC motor exceeds a threshold for a predetermined period of time.

22. The throttle control apparatus of claim 19, wherein said parameter is a parameter determined by at least the output of a sensor currently being used to control the valve.

23. A control method for controlling the degree of opening of a valve with an electric motor by the use of two valve angle sensors operatively coupled with the valve to detect the degree of valve opening, the method comprising the steps of:

determining that one of the two sensors is abnormal when a difference between outputs of the two sensors is greater than a predetermined value; and determining which of the two sensors is abnormal when it is determined that one of the two sensors is abnormal and a valve control parameter generated in response to an output of one of said sensors exceeds a threshold for a predetermined period of time.

24. The method of claim 23, further comprising the steps of:

detecting electric current flowing to the electric motor; and determining which of the two sensors is abnormal based on intensity of the detected electric current.

25. The method of claim 23, wherein the abnormal sensor determining step includes a step of determining which of the two sensors is abnormal based on a duty ratio of a PWM signal corresponding to the intensity of electric current driving the DC motor.

26. The method of claim 23, wherein said parameter is a parameter determined by at least the output of a sensor currently being used to control the valve.

27. A valve control system comprising:

a plurality of valve angle sensors, each sensor disposed to detect the degree of valve opening; and a feedback control circuit connected to receive inputs from each of said sensors and to provide a control output connected to drive a valve-controlling motor;

said control circuit including means to detect which, if any, of said sensors is abnormal by monitoring said control output.

28. A valve control system as in claim 27 wherein said control circuit includes a digital processor programmed to:

(a) monitor a difference between sensor outputs to detect initial occurrence of a sensor abnormality;

(b) monitor said control output to determine which one of the sensors is abnormal; and (c) thereafter use a sensor not determined to be abnormal.

29. A valve control system as in claim 28 wherein said digital processor is further programmed to:

(d) monitor successive samples of a single sensor's output to detect whether it is abnormal; and (e) if no normal sensor outputs are thus determined to be available, thereafter estimating a normal sensor outputs based on prior sensor outputs before its abnormality was detected.

30. A valve control method comprising:

detecting the degree of valve opening using a plurality of valve angle sensors, each sensor disposed to detect the degree of valve opening;

processing outputs from one of said sensors to provide a control output connected to drive a valve-controlling motor;

monitoring the outputs of all sensors to determine when a sensor abnormality has occurred; and detecting which of said sensors is abnormal by monitoring said control output.

31. A valve control method as in claim 30 wherein said processing and monitoring steps include:

(a) monitoring a difference between sensor outputs to detect initial occurrence of a sensor abnormality;

(b) monitoring said control output to determine which one of the sensors is abnormal; and (c) thereafter using a sensor not determined to be abnormal.

32. A valve control method as in claim 31 wherein said monitoring and processing steps include:

(d) monitoring successive samples of a single sensor's output to detect whether it is abnormal; and (e) if no normal sensor outputs are thus determined to be available, thereafter estimating a normal sensor outputs based on prior sensor outputs before its abnormality was detected.

* * * * *